United States Patent [19]

Goodman

[11] 3,983,534

[45] Sept. 28, 1976

[54] VEHICLE ALARM

[76] Inventor: James R. Goodman, 209 Linda Lane, Euless, Tex. 76039

[22] Filed: Mar. 17, 1975

[21] Appl. No.: 559,131

[52] U.S. Cl. .............................. 340/63; 307/10 AT; 331/113 R; 340/274 R
[51] Int. Cl.² ........................................ B60R 25/10
[58] Field of Search ............... 340/63, 64, 274, 276, 340/52 D, 52 F; 307/10 AT; 180/114; 331/113, 182

[56] References Cited

UNITED STATES PATENTS

| | | | |
|---|---|---|---|
| 3,421,157 | 1/1969 | Atkins | 340/251 |
| 3,585,584 | 6/1971 | Behrend | 340/64 |
| 3,605,087 | 9/1971 | Nine | 340/64 |
| 3,740,713 | 6/1973 | Teich | 340/64 |
| 3,781,854 | 12/1973 | Kaufman et al. | 340/64 |
| 3,930,226 | 12/1975 | Plumberg | 340/64 |

Primary Examiner—John W. Caldwell
Assistant Examiner—Joseph E. Nowicki
Attorney, Agent, or Firm—Peter J. Murphy

[57] ABSTRACT

An alarm control circuit, designed as a unit package to be mounted in the interior of a vehicle, is adapted for connection to the ignition switch circuit, to a vehicle door or other closure operated light switch circuit, and to the vehicle battery, with the output being connected to the vehicle horn circuit. The alarm control circuit is completely automatic when operated through the vehicle ignition switch and a vehicle closure switch, and sounds the vehicle horn intermittently when a closure is opened by unauthorized persons. The alarm control circuit may also be connected to the vehicle headlight switch circuit to provide the ancillary function of a warning signal, should the headlights be left on with the ignition switch off.

10 Claims, 5 Drawing Figures

ALARM CONTROL CIRCUIT

CONVENTIONAL VEHICLE CLOSURE SWITCH CIRCUIT

CONVENTIONAL VEHICLE IGNITION SWITCH CIRCUIT

CONVENTIONAL VEHICLE HEADLIGHT CIRCUIT

CONVENTIONAL VEHICLE HORN CIRCUIT

ALARM CONTROL CIRCUIT

VEHICLE ALARM

BACKGROUND AND SUMMARY OF THE INVENTION

This invention relates to an entry alarm system for vehicles such as automobiles, trucks, buses and motor homes, activated by unauthorized opening of vehicle closures.

While entry alarm systems for such vehicles are known, such systems are frequently cumbersome and difficult to install in an existing vehicle, resulting in expense which is prohibitive of widespread use of such systems.

A disadvantage of some such known systems, which sound a warning in the event of unauthorized opening of a door, trunk lid, or hood for example, is that the systems require a key operated external deactivation switch to prevent sounding of the vehicle alarm through normal entry of the vehicle or trunk by the owner or other authorized user. This is a great inconvenience and disadvantage in that the user must always deactivate the system before entering his vehicle and, correspondingly, must reactivate the system after leaving his vehicle. This is time consuming and inconvenient; and the system is entirely defeated in the event the user should forget to reactivate the system upon leaving the vehicle.

An object of this invention is to provide a vehicle burglar alarm system which is completely automatic in operation, and does not require the use of a deactivation switch.

Another object of this invention is to provide a burglar alarm control system which is readily adapted to be installed in existing vehicles, and to be easily connected to existing operating circuits of the vehicle.

A further object of this invention is to provide an alarm control system which utilizes the vehicle horn and which, in a mischief situation, sounds the vehicle horn intermittently to warn of such mischief situation.

These objects are accomplished in a control circuit which is adapted for connection to the vehicle horn circuit, the vehicle ignition switch circuit, and a closure switch circuit which includes a light switch for a door, a trunk deck lid, or a hood, and which is completely automatically operated by the circuits to which it is connected. The control circuit includes the following subcircuits. An output circuit includes a transistor switch for energizing the alarm device. A signal generator circuit for generating a control signal has its output coupled to the base of the transistor switch. A diversion circuit includes a normally closed switch, for directing the signal generator circuit output to effect shut-off of the output circuit transistor switch. A closure control circuit and an ignition control circuit, connected respectively to the vehicle closure switch circuit and ignition switch circuits, are responsive to the open condition of both the vehicle closure switch and ignition switch to maintain the diversion circuit switch closed; and are responsive to the closed condition of the vehicle closure switch and open condition of the ignition switch to effect the opening of the diversion circuit switch. The opening of the diversion circuit switch effects the closing of the output circuit transistor switch to effect energization of the alarm device.

The novel features and the advantages of the invention, as well as additional objects thereof, will be understood more fully from the following description when read in connection with the accompanying drawings.

DRAWINGS

DESCRIPTION OF THE PREFERRED EMBODIMENT

Figure 2:
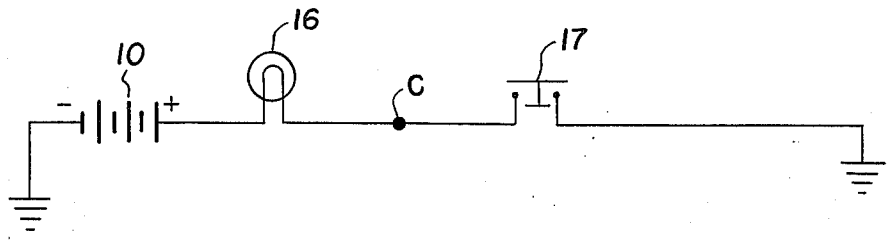
FIG. 2 is a schematic diagram of a typical vehicle interior light and door switch circuit.

In preferred form, an auto entry alarm according to the invention is embodied in a control circuit for ready connection to existing vehicle circuits and which utilizes the vehicle circuits for operation of the system and for the energizing of an alarm device. In the preferred form, the alarm device is the vehicle safety horn; however it will be understood that any suitable electrically operated alarm signal device might be used. In the following described circuitry, the power supply is the 12 volt DC battery commonly used in many automotive vehicles.

FIGS. 1 through 4 of the drawing illustrate conventional and typical vehicle circuits to which the control circuit is connected.

Figure 1:
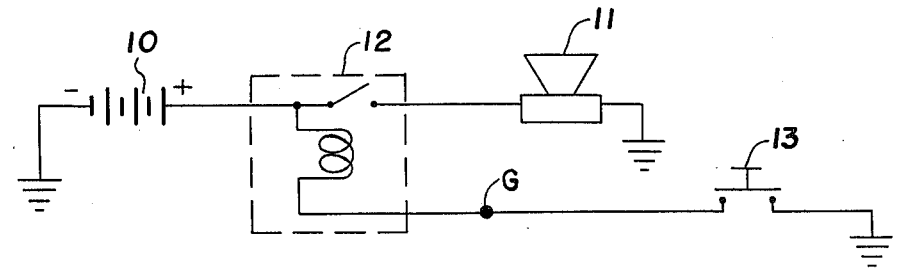
FIG. 1 is a schematic diagram of a typical vehicle horn circuit.

FIG. 1 illustrates a typical horn circuit wherein a horn 11 and the contacts of a horn relay 12 are connected in series between a 12 volt DC battery 10 and vehicle ground. For operating the horn normally, the coil of relay 12 is connected in series with a horn ring switch 13 between the battery 10 and ground. A tap point G in the horn operating circuit between the relay coil 12 and the horn switch 13 when connected to ground, will operate the horn.

FIG. 2 is a conventional circuit for a vehicle interior light, such as a dome light operated by a push button door switch. In this circuit an interior light 16 and a push button switch 17 are connected in series between the battery 10 and ground. It will be seen that when the door is closed and the switch 17 and the circuit are open, the voltage at a tap point C will be the battery voltage or approximately 12 volts. When the door is opened and the switch and circuit closed, the voltage at point C will approximate ground or zero volts. The vehicle might be provided with similar light control circuits such as a trunk light and a trunk lid operated control switch, or a hood light and a hood operated control switch. Such vehicle doors, trunk lids or hoods are referred to herein as "closures"; and the associated switch circuits are referred to as closure switch circuits.

Figure 3:
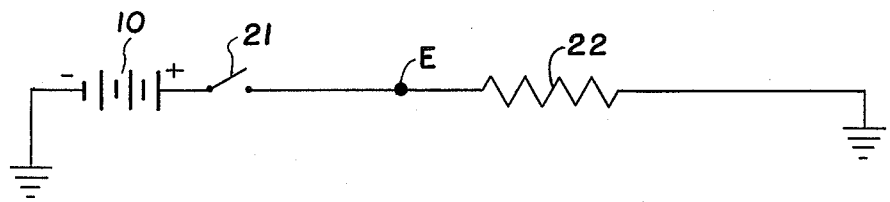
FIG. 3 is a schematic diagram of a typical vehicle ignition switch circuit.

FIG. 3 is a partial schematic of an ignition-accessory switch circuit wherein the ignition-accessory switch 21 and a load 22, such as relay coils or a radio, are connected in series between the battery 10 and ground. In this specification references to the ignition switch 21 will be understood to include the ignition-accessory switch combination, since the operating functions will be performed with the switch in either the ignition or accessory positions. It will be seen that when the ignition switch is open, the voltage at a tap point E will be substantially ground voltage; and that when the ignition switch 21 is closed, the voltage at terminal E will be approximately at battery voltage.

Figure 4:
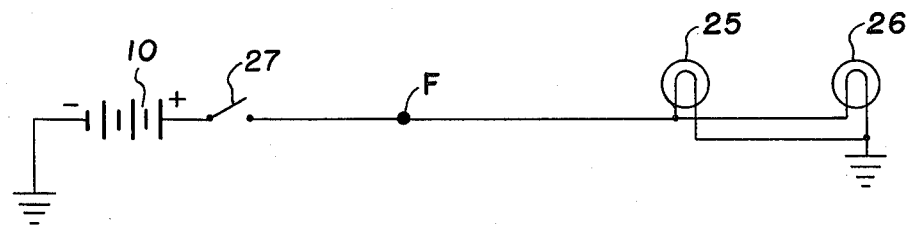
FIG. 4 is a schematic diagram of a typical vehicle headlight switch circuit.

FIG. 4 is a typical headlight circuit wherein parallel connected headlights 25 and 26 are connected in series with a headlight switch 27 between the battery 10 and ground. It will be seen that when the switch is open, the voltage at a tap point F will be approximately ground voltage; and that when the switch is closed the voltage at tap point F will be approximately the battery voltage.

Figure 5:
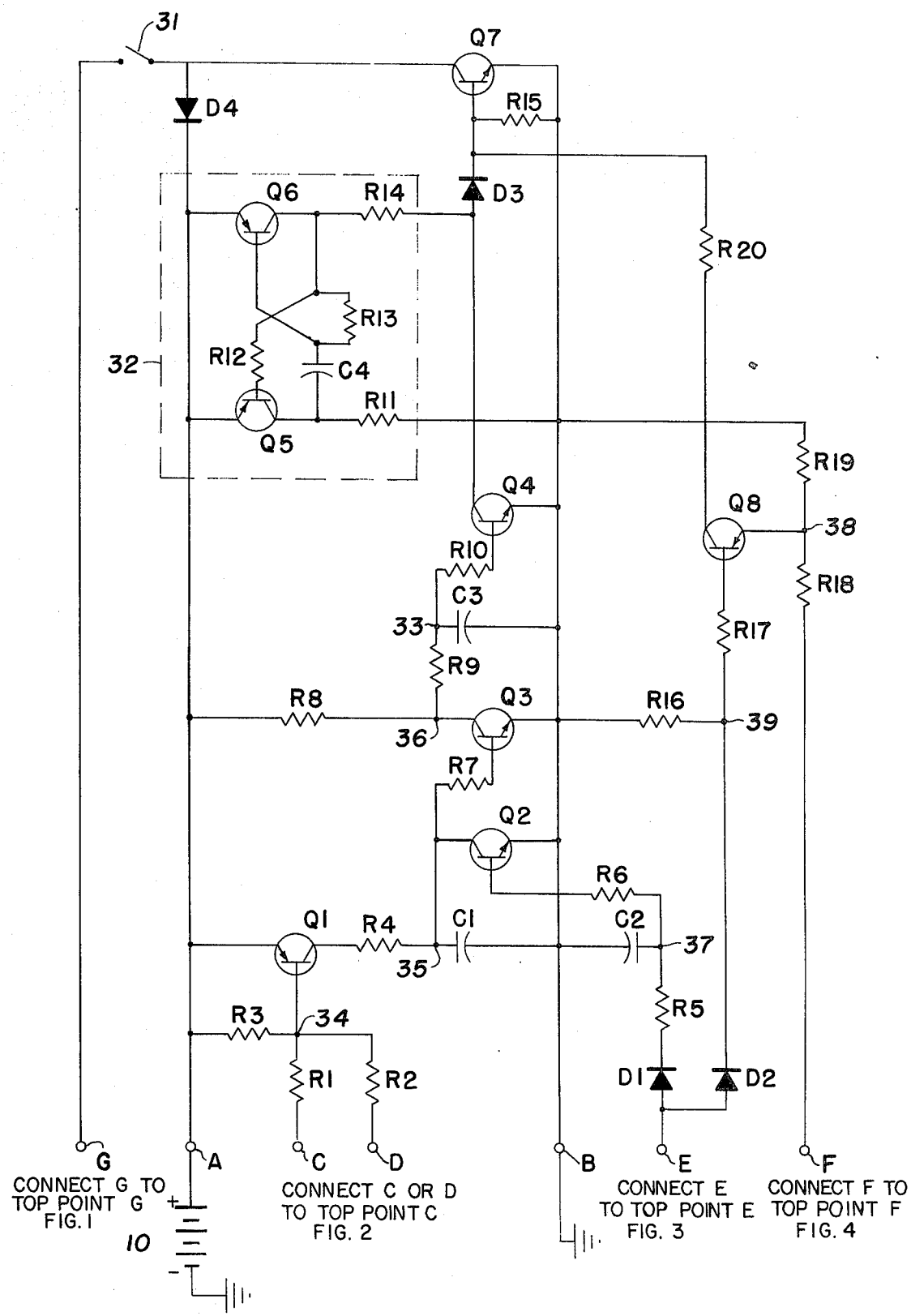
FIG. 5 is a schematic diagram of an alarm control circuit for connection to typical vehicle circuits.

The control circuit illustrated in FIG. 5 may be conveniently packaged in a suitable housing for mounting in some suitable location preferably within the interior of the vehicle body; and this circuit includes terminals G, D, D, E and F which are to be connected to respective corresponding tap points of the above described vehicle circuits by means of suitable conductors. The terminals C and D are connected in parallel so that the control circuits of FIG. 5 may be connected to two or more closure switch circuits. Terminal A of this control circuit is to be connected to the 12 volt DC vehicle battery 10 and terminal B is to be connected to vehicle ground.

This control circuit includes a deactivate switch 31 which may be mounted on the control circuit housing, or alternatively may be located remotely at some hidden location known only to the vehicle owner or user. This switch is provided for the principal purpose of deactivating the signal device for the purpose of servicing the vehicle for example.

The alarm control circuit will now be described in connection with various conditions of operation, beginning with the condition where the vehicle is parked with the ignition key removed and all closures in closed condition. When the control circuit is connected in the vehicle, a signal generating circuit in the form of an astable multivibrator 32 is oscillating continuously. The multivibrator consists of transistors Q5 and Q6, resistors R11, R12, R13 and R14, and capacitors C4. The control circuit is operating quiescently in this condition, with the collector output from transistor Q6 being diverted from the power output circuit to ground, through transistor Q4. Transistor Q4 is conducting in this condition, being saturated by the base current flowing through a biasing circuit including resistors R8, R9 and R10, which biasing circuit impresses a voltage of approximately 9 volts at the circuit point 33; and accordingly an entry delay capacitor C3 is charged to approximately 9 volts.

The output circuit includes a power Darlington transistor Q7 which is connected in series with the deactivate switch 31 and the terminal G. When the transistor Q7 is conducting it connects the terminal G to ground thereby energizing the horn circuit; and the terminal G is the output terminal for the control circuit. In the quiescent state the transistor Q7 remains nonconducting since the multivibrator output is diverted through the transistor Q4 and any leakage current is further diverted through resistor R15. In this quiescent state of the control circuit the transistors Q1, Q2, Q3, and Q8 are nonconducting as will now be described.

Referring to the closure control circuit associated with the terminals C and D, since at least one of these terminals C is connected to a closure switch circuit such as the interior light circuit of FIG. 2, when the respective closure member is closed and the associated switch is open the voltage appearing at terminal C is approximately 12 volts. The transistor Q1 then is not forward biased and is therefore nonconducting.

Terminal E is connected to the open ignition switch circuit as above described, and therefore at approximately zero voltage; and accordingly transistor Q2, in the ignition control circuit, is not forward biased and is nonconducting. Since transistor Q1 is not conducting and alarm hold capacitor C1 is not charged, transistor Q3 is not forward biased and is not conducting.

Assume now that a vehicle closure is opened, either by the vehicle owner or a person bent on theft of the vehicle or its contents, and the switch 17 (or alternative equivalent switch) closes. The voltage at terminal C then becomes approximately zero and the voltage impressed at circuit point 34 in the closure control circuit is some voltage less then 12 volts provided by the voltage divider consisting of resistors R1 and R3. Bias current is then supplied to transistor Q1, and this transistor saturates to impress a voltage of approximately 12 volts at circuit point 35 in the closure control circuit to charge alarm hold capacitor C1. With transistor Q1 conducting, transistor Q3 in a first bypass circuit saturates and conducts and the voltage at circuit point 36 in the biasing circuit becomes substantially zero. This causes entry delay capacitor C3 to discharge through resistors R10 and R9 (principally through R9) of an entry delay circuit; and, after a discharge delay period of approximately 30 seconds, the voltage at point 33 reduces sufficiently that transistor Q4 stops conducting and the multivibrator output then becomes available to drive the output circuit transistor Q7 through the resistor R14 and diode D3. The transistor Q7, then driven by the multivibrator, is alternately conducting and nonconducting at a frequency rate or cycle determined by the multivibrator. This may be a 2-second cycle for example with the transistor conducting for 1 second and not conducting for 1 second. Accordingly the horn circuit, connected to the terminal G, energizes the vehicle horn intermittently on this 2-second cycle. Diode D4 prevents the inductive voltage from the horn relay damaging the control circuit when transistor Q7 turns off.

The above mentioned entry delay circuit and capacitor C3 maintain transistor Q4 conducting (i.e., maintain the quiescent state) for approximately 30 seconds after the opening of a vehicle closure; and this is to permit the car owner to enter the vehicle in a normal fashion and deactivate the alarm system by inserting the key and closing the ignition switch as will be described. The operator has 30 seconds (entry delay period) to do this. If the closure is opened by an intruder however, the alarm horn will begin sounding after 30 seconds, and will continue sounding indefinitely so long as the closure remains open.

The intruder will possibly react by immediately closing the vehicle closure, seeking to shut off the alarm. The alarm will continue sounding however because of the alarm hold circuit including capacitor C1 and resistor R7. When the closure is closed, the transistor Q1 will shut off; however the alarm hold capacitor C1 will discharge through resistor R7 for a period of approximately 2 minutes, thereby maintaining transistor Q3 conducting so that the alarm keeps sounding. After 2 minutes the control circuit will revert to the quiescent state.

Assume now that the vehicle owner has entered the vehicle and turns the ignition switch on. The voltage at terminal E becomes approximately 12 volts and this biases transistor Q2 through the ignition control circuit diode D1 and resistors R5 and R6 so that transistor Q2 saturates and conducts. Simultaneously a voltage of approximately 12 volts is impressed at circuit point 37 to charge exit delay capacitor C2 to approximately 12 volts. With transistor Q2 conducting the circuit point 35 is connected directly to ground defining a second bypass circuit; and this bypass circuit reduces or maintains the voltage at point 35 near zero, thereby diverting the current from transistor Q1 to ground which stops or prevents transistor Q3 from conducting, and therefore either produces or maintains the quiescent state. Also, the alarm hold capacitor C1 will be discharged through bypass circuit transistor Q2.

Accordingly at any time that the ignition switch is turned on, the circuit is in the quiescent state and cannot effect the operation of the warning horn. Also, should the warning horn be sounding under the control of this circuit, turning the ignition switch on will immediately produce the quiescent state and stop the sounding of the horn.

An exit delay circuit including exit delay capacitor C2 is provided to allow the vehicle user to turn off the ignition, remove the key, exit from the vehicle and close the door without sounding the alarm. This exit delay circuit, including diode D1 and resistor R6, provides a delay period of about 1 minute while capacitor C2 discharges through resistor R6 to maintain bias voltage at the transistor Q2 to maintain the quiescent state for that period.

From the foregoing it will be apparent that the control circuit is maintained in the quiescent state either with all vehicle closure members closed and the ignition switch off, or with the ignition switch on, regardless of the condition of the closure members. Accordingly, at any time when the owner of the vehicle desires to have a closure member open for any reason, such as loading or unloading the vehicle over an extended period of time, cleaning the vehicle interior etc., he may readily deactivate the alarm system by turning the ignition switch either to the on or accessory position. Alternatively of course he may open the deactivate switch 31; however, this would be undesirable since he may forget to turn the switch back on and this would of course defeat the burglar alarm system.

An ancillary feature of the control circuit is that it may be used to sound an alarm when the vehicle user inadvertently leaves the vehicle with the headlights on, and assuming that he turns the ignition switch off. This function is provided by a headlight warning circuit of the control circuit, connected to the above described ignition circuit and headlight circuit. Referring to the control circuit and the headlight circuit of FIG. 4, when the headlights are on the terminal F is at approximately 12 volts and, through the voltage divider consisting of resistors R18 and R19, the circuit point 38 which is the emitter of transistor Q8 are impressed with approximately 9 volts. With the ignition switch on, the voltage at contact E is approximately 12 volts; and the voltage impressed at circuit point 39 is approximately 11.4 volts, reduced by a voltage drop across the diode D2. The base bias voltage for transistor Q8 is therefore approximately 11.4 volts. In this condition transistor Q8 is reverse biased and nonconducting. If the ignition switch is now turned off, the transistor Q8 is biased by base current flowing through resistors R17 and R16; and transistor Q8 saturates raising its collector voltage to approximately 9 volts. Current then flows through resistor R20 to the base of output circuit transistor Q7, causing it to saturate resulting in the vehicle horn being sounded continuously. The horn will continue to sound until either the headlights are turned off or the ignition switch is turned on. Diode D3 prevents bypassing of this driving current through transistor Q4. Should the vehicle operator desire to have the headlights on without the horn sounding, he has the option of either turning on the ignition-accessory switch or opening the deactivate switch 31.

In the above described circuit, by way of example the described or illustrated components may have values as follows:

| CAPACITORS | C1 | 100 uf at 15 V |
| --- | --- | --- |
|  | C2 | 50 uf at 15 V |
|  | C3 | 50 uf at 15 V |
|  | C4 | 1 uf at 15 V |
| DIODES | D1 | IN 4001 |
|  | D2 | IN 4001 |
|  | D3 | IN 4001 |
|  | D4 | IN 4001 |
| RESISTORS | R1 | 100 K |
|  | R2 | 100 K |
|  | R3 | 47 K |
|  | R11 | 47 K |
|  | R14 | 47 K |
|  | R16 | 47 K |
|  | R17 | 47 K |
|  | R20 | 47 K |
|  | R4 | 4.7 K |
|  | R5 | 1 K |
|  | R6 | 470 K |
|  | R7 | 470 K |
|  | R10 | 470 K |
|  | R12 | 470 K |
|  | R13 | 470 K |
|  | R8 | 10 K |
|  | R19 | 10 K |
|  | R9 | 150 K |
|  | R15 | 22 K |
|  | R18 | 3.3 K |
| TRANSISTORS | Q1 | 2N4248 |
|  | Q5 | 2N4248 |
|  | Q6 | 2N4248 |
|  | Q8 | 2N4248 |
|  | Q2 | 2N3565 |
|  | Q3 | 2N3565 |
|  | Q4 | 2N5306 |
|  | Q7 | MPSU-45 |

What has been described is an entry alarm system for automotive vehicles which can be produced in the form of a convenient circuit package adapted to be mounted within the interior of the vehicle body and which can be readily connected to existing vehicle circuits with minimum difficulty. The result is an alarm system for such vehicles which can be manufactured, marketed and installed at a price which will enable use by virtually all automobile and truck owners.

A particular feature and advantage of the system is that it is completely automatic when connected to two operating circuits such as the ignition switch circuit and a door switch interior light operating circuit, in that it is always turned on and ready for service, and in that it need not be turned off except for very special situations. Accordingly there is little possibility that the user would turn the system off and forget to turn it on, resulting of course in complete loss of protection. While the system is fully automatic, it has features that allow a reasonable amount of time (30 seconds) for the owner to unlock and enter his vehicle and deactivate the alarm system through the ignition-accessory switch, and also sufficient time (1 minute) to leave his vehicle after turning off the ignition switch including removal of a few packages for example. The system conveniently uses the vehicle horn and horn control circuit;

but sounds the horn intermittently to establish a warning signal distinctive from a conventional horn sounding, which would alert nearby persons that some mischief is in progress. The standard "hot-wiring" of the vehicle does not deactivate the system.

Where the ancillary feature of the headlight warning system is included, this again is conveniently connected to the headlight switch circuit; and the warning system is again readily deactivated either through the ignition switch or the special deactivate switch.

While the preferred embodiment of the invention has been illustrated and described, it will be understood by those skilled in the art that changes and modifications may be resorted to without departing from the spirit and scope of the invention.

What is claimed is:

1. An alarm control circuit for use with a vehicle having a battery, an ignition switch circuit including an on-off switch for determining respective closed and open conditions of said ignition switch circuit, a closure operated switch circuit including an on-off switch for determining respective closed and open conditions of said closure switch circuit, and an alarm device; said alarm control circuit comprising
    an output circuit including a transistor switch for energizing said alarm device;
    a signal generator circuit for generating a control signal, said signal generator circuit being coupled to the base of said output circuit transistor switch;
    diversion circuit means including a normally closed switch, for diverting said signal generator circuit control signal to effect shut-off of said output circuit transistor switch; closure control circuit means, including a terminal for connection to a vehicle closure switch; ignition control circuit means including a terminal for connection to the vehicle ignition switch circiut; said alarm control circuit being responsive to the open condition of said closure switch circuit and the open condition of said ignition switch circuit to maintain said diversion circuit switch closed; and said alarm control circuit being responsive to the closed condition of said closure switch circuit and the open condition of said ignition switch circuit to effect the opening of said diversion circuit switch; and the opening of said diversion circuit switch effecting the closing of said output circuit transistor switch to effect energization of said alarm device.

2. An alarm control circuit as set forth in claim 1 further comprising
    said alarm control circuit being responsive to the closed condition of said ignition switch circuit for maintaining said diversion circuit switch closed, regardless of the condition of said closure switch circuit.

3. An alarm control circuit as set forth in claim 1 further comprising
    entry delay circuit means including a charge storing device for maintaining said diversion circuit switch closed for a predetermined time interval following the closing of said closure switch circuit, to allow normal entry into the vehicle without energizing the alarm device.

4. An alarm control circuit as set forth in claim 1 further comprising
    alarm hold circuit means including a charge storing device for maintaining said diversion circuit switch open for a predetermined time interval following the opening of said closure switch circuit, to maintain the alarm device energized for said predetermined time interval.

5. An alarm control circuit as set forth in claim 2 further comprising
    exit delay means including a charge holding device for maintaining said diversion circuit switch closed for a predetermined time interval following the opening of said ignition switch circuit, to allow normal exit from the vehicle without energizing the alarm device.

6. An alarm control circuit as set forth in claim 1 further comprising
    said diversion circuit switch comprising a transistor switch;
    bias circuit means normally forward biasing said diversion circuit transistor switch;
    first bypass circuit means including a transistor switch for removing forward bias voltage from said diversion circuit transistor switch;
    said closure control circuit means being responsive to the closed condition of said closure switch circuit to provide forward bias voltage to said first bypass circuit transistor switch, to effect the energization of said alarm device;
    second bypass circuit means including a transistor switch for removing forward bias voltage from said first bypass circuit transistor switch to stop the energization of said alarm device;
    said ignition control circuit means being responsive to the closed condition of said ignition switch circuit for providing forward bias voltage to said second bypass circuit transistor switch to prevent the energization of said alarm device.

7. An alarm control circuit as set forth in claim 6 further comprising
    said bias circuit means including an entry delay charge storing capacitor, for providing forward bias voltage to said diversion circuit transistor switch for a predetermined time interval following forward biasing of said first bypass circuit transistor switch.

8. An alarm control circuit as set forth in claim 6 further comprising
    said closure control circuit means including an alarm hold charge storing capacitor, for providing forward bias voltage to said first bypass circuit transistor switch for a predetermined time interval following the opening of said closure switch circuit.

9. An alarm control circuit as set forth in claim 6 further comprising
    said ignition control circuit means including an exit delay charge storing capacitor, for providing forward bias voltage to said second bypass circuit transistor switch for a predetermined time interval following the opening of said ignition switch circuit.

10. An alarm control circuit as set forth in claim 1 wherein said vehicle also has a headlight switch circuit including an on-off switch for determining respective closed and open conditions of said headlight switch circuit; said alarm control circuit further comprising
    a headlight warning circuit including a transistor switch for controlling bias voltage to said output circuit transistor switch;
    said headlight warning circuit being connected to the vehicle ignition switch circuit and to the vehicle headlight switch circuit, and being responsive to the closed condition of said headlight switch circuit and the open condition of said ignition switch circuit to provide forward bias voltage to said headlight warning circuit transistor switch, thereby effecting energization of the alarm signal device.

* * * * *

UNITED STATES PATENT OFFICE
CERTIFICATE OF CORRECTION

PATENT NO. : 3,983,534
DATED : September 28, 1976
INVENTOR(S) : James R. Goodman It is certified that error appears in the above-identified patent and that said Letters Patent are hereby corrected as shown below:

Claim 1, line 32   begin new paragraph with "closure control circuit"

Claim 1, line 34   after "switch" insert --circuit--

Claim 5, line 3    after "delay" insert --circuit--

Signed and Sealed this

Fourteenth Day of December 1976

[SEAL]

Attest:

RUTH C. MASON
*Attesting Officer*

C. MARSHALL DANN
*Commissioner of Patents and Trademarks*